United States Patent Office 3,469,091
Patented Sept. 23, 1969

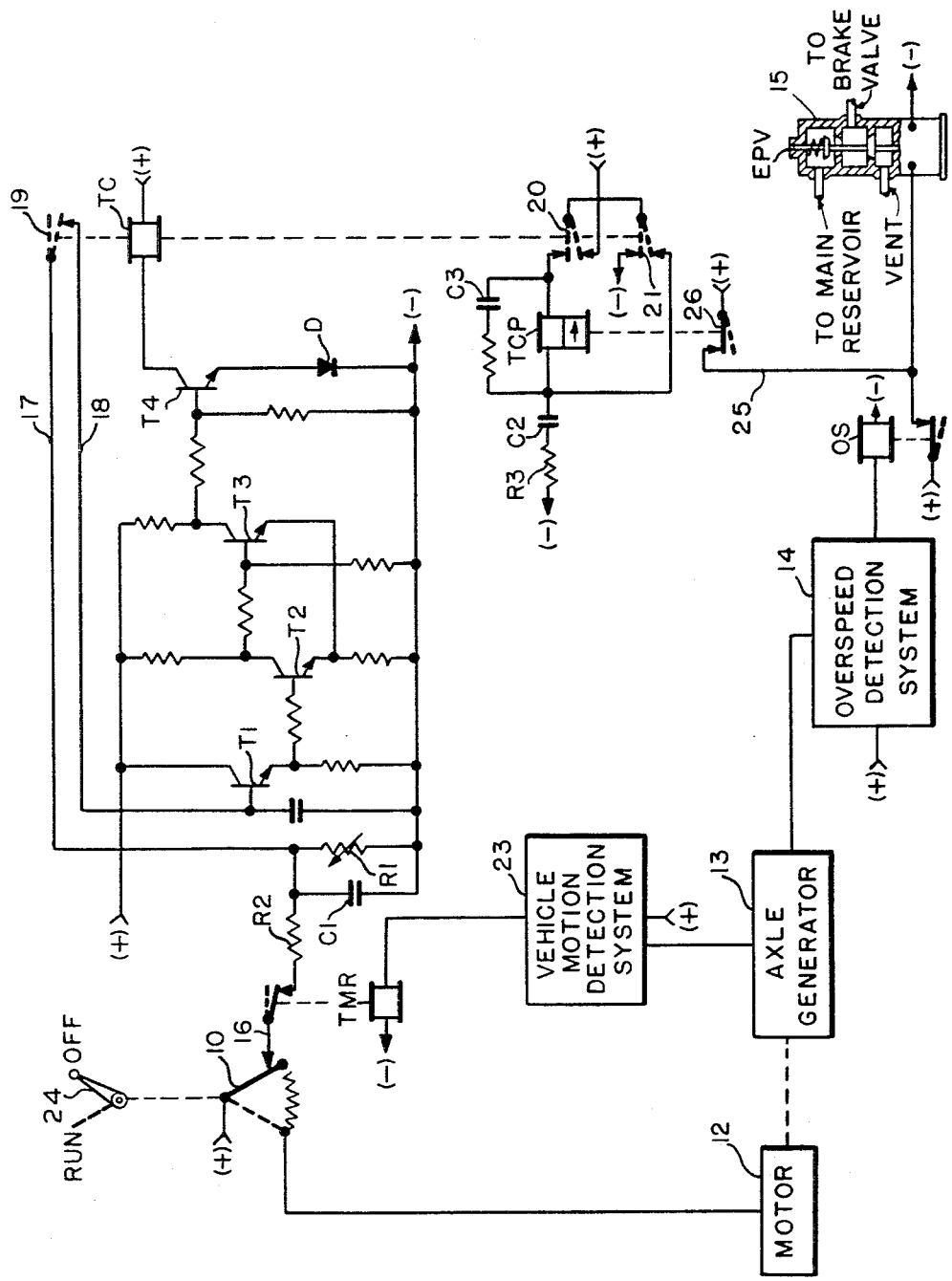

3,469,091
INITIAL WHEEL SLIP BYPASSING SYSTEM
Warren R. Wrege, Rochester, N.Y., assignor to General Signal Corporation, Rochester, N.Y., a corporation of New York
Filed Nov. 24, 1967, Ser. No. 685,464
Int. Cl. B61l 3/00
U.S. Cl. 246—167                                      9 Claims

ABSTRACT OF THE DISCLOSURE

Apparatus for use with a self-powered vehicle having overspeed detection and automatic braking equipment. Wheel slip which is encountered upon starting the vehicle and which is detected as an overspeed is prevented, by means of a time controlled relay, from causing automatic braking. For a limited time after vehicle power is applied, the relay maintains a circuit which bypasses the overspeed detection system rendering it ineffective to initiate automatic braking.

BACKGROUND OF THE INVENTION

Field of the invention

This invention relates to vehicles having overspeed detection and automatic brake application equipment, and more particularly, relates to a means for preventing an automatic brake application caused by wheel slip encountered upon starting of such vehicles.

Description of the prior art

In some self-powered vehicles, such as locomotives, overspeed detection equipment is used in connection with a speed control system. Usually, upon detection of an overspeed condition, a brake application is automatically imposed upon the vehicle. Sometimes, upon starting of such vehicles, wheel slip occurs which is detected as an overspeed condition with the result that a brake application takes place. This is undesirable because another starting operation is then required, in turn, can lead to another brake application and this sequence can continue indefinitely.

Although some vehicles are equipped with wheel slip detectors, the problem still persists. Conventional wheel slip detectors are slow-acting by comparison with overspeed detectors now in use, and slip information therefore is not available in time to be used to forestall the operation of the overspeed detection and braking system.

STATEMENTS OF OBJECTS

It is therefore an object of this invention to provide an arrangement which will improve the starting operation of vehicles having overspeed detection and brake application equipment.

It is another object of this invention to provide an arrangement which will render the overspeed detection system ineffective during starting operations.

It is another object of this invention to provide a means for bypassing overspeed detection equipment during starting operations of self-powered vehicles.

SUMMARY OF THE INVENTION

In one form, the invention comprises a timer which is connected to the throttle control and which measures a predetermined time interval beginning with the application of vehicle power. The timer is used to control bypassing means which renders the overspeed detection system ineffective to cause an automatic brake application during the predetermined time interval.

In another form, the timer is connected to a motion detector system. In this case the time interval is measured from the time vehicle motion is first detected. As in the above mentioned arrangement, the overspeed detection system is prevented from causing an automatic brake application until the end of the predetermined interval.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

The drawing is a diagram, partly in block form, showing the invention.

DESCRIPTION OF PREFERRED EMBODIMENT

There is represented in the drawing a throttle control 24 having a contact 10 shown in the OFF position. Although a manual throttle has been shown for the sake of simplicity, any suitable throttle control, manual or automatic, would suffice for the purpose of this invention. As the throttle shown is operated to the left, varying degrees of vehicle power are applied by means of the motor 12. An axle generator 13 is shown connected to the motor by means of a dotted line. This is merely to signify that as vehicle power is applied by means of the motor 12, and the vehicle thus gets under way, the axle generator 13 will be operated. The overspeed detection system 14 is driven by the axle generator. An overspeed is merely a velocity in excess of some chosen standard velocity. The overspeed detection system used may be any well known device such as that shown in U.S. Patent 2,915,623. The overspeed detection system controls the operation of relay OS. This relay is maintained energized until an overspeed is detected, at which time it will be released. The front contact of this relay is connected through the winding of the solenoid in electropneumatic valve 15 to negative energy. The electropneumatic valve 15 is thus maintained energized while no overspeed is detected.

Contact 10 of the throttle control is connected to wire 16 when the throttle is in the OFF position. Wire 16 is connected through the back contact of relay TMR to a timing circuit. The relay TMR is controlled by a vehicle motion detection system 23. The timing circuit is comprised of condenser C1, resistor R1 and transistors T1, T2, T3 and T4 and relay TC. Contacts 20 and 21 of relay TC are used to control the operation of relay TCP. Relay TCP controls a circuit extending from (+) through contact 26, conductor 25 and electropneumatic valve 15 to (−).

When the throttle control is in the OFF position, positive energy is applied to conductor 16 through contact 10. The TMR relay is normally released when the vehicle is at a standstill. Under those conditions therefore, positive energy will be applied constantly through resistor R2 across condenser C1. This will cause condenser C1 to become fully charged. At the same time, energy will be applied through conductors 17 and 18, assuming relay TC to be released, to the base of transistor T1. The effect of applying positive energy to the base of transistor T1 is to bias it on. Once transistor T1 is on, the base of transistor T2 will swing from negative to positive and it also will be turned on as a consequence. The bias conditions of transistor T3 are such that it is normally on. But when transistor T2 goes on, the base of transistor T3 will become more negative and will be made to turn off. Transistor T4 is normally off. When transistor T3 goes off the base of transistor T4 will be made more positive and it will be turned on. Once transistor T4 is on, the windings of relay TC are energized by means of an electrical path passing through that transistor and diode D to negative energy. This will cause back contact 19 of relay TC to be opened, breaking the positive feed to the base of transistor T1. Once that happens, T1 and the other transistors in the timer revert to their original conductivity states. Thus, transistor T4 returns to its off condition. Relay TC becomes deenergized and back contact 19 is once again closed. Positive energy is again applied to the base of transistor T1 and another cycle of operation is commenced. It can be seen that with the throttle control in the OFF position, relay TC will be coding and capacitor C1 will receive a charge.

If the throttle control is moved away from its OFF position, contact 10 will no longer supply positive energy to conductor 16. But condenser C1 will apply positive energy to conductor 17 which will cause the coding action of relay TC to continue. This coding action will continue only until capacitor C1 becomes discharged to the extent that it will no longer turn transistor T1 on. The length of the interval required for such discharge to take place depends upon the sizes of condenser C1 and resistor R1. Resistor R1 is made variable so that this time interval may be conveniently determined. It can be seen that the timer is maintained in a "set" condition as long as the throttle controller is in the OFF position; i.e., the condenser C1 is maintained charged and the timer is ready to measure the predetermined time interval when the controller is moved from the OFF position.

When relay TC is in a released condition a path is established from (+) through back contact 20, back contact 21, capacitor C2 and resistor R3 to (−). When relay TC picks up, capacitor C2 will discharge through the winding of relay TCP and through capacitor C3, front contact 20 of relay TC, and front contact 21 to negative. Relay TCP will thus be picked up. When relay TC releases, capacitor C2 will again charge. Relay TCP will remain picked up because capacitor C3 will discharge through its winding. The time constant for the discharge of capacitor C3 is chosen to be large enough to maintain relay TCP picked up until capacitor C2 is again discharged. The result is that TCP will remain picked up as long as the coding action of relay TC continues.

The front contact of relay TCP is used to supply energy to the solenoid of electropneumatic valve 15. This valve may be of any suitable type, such as that employed in the said United States Patent 2,915,623. If energy is removed from this valve, a plunger will be permitted to drop and the air pressure in the brake system will be dissipated through the vent. In conventional braking systems, this will cause the brakes to be applied.

It is clear that while the relay TC is coding and the relay TCP is held up, no brake application will be caused by the overspeed detection system. This system is effectively bypassed while relay TCP is energized because energy is then supplied directly to the solenoid of electropneumatic valve 15 through contact 26. Thus, even if an overspeed is detected and relay OS is deenergized, the electropneumatic valve 15 will nevertheless remain energized and no brake application will result.

Train motion detection system 23 will cause relay TMR to be energized once sufficient velocity of the vehicle is developed. While relay TMR is energized, no further charging of capacitor C1 can take place, even if the throttle control 24 is returned to the OFF position. Thus, the timer will operate only upon the acceleration of the vehicle from a standstill. This means that the overspeed detection system 14 is bypassed only during starting operations. Only initial wheel slip, that which occurs upon starting, is ignored.

The purpose of this invention as mentioned earlier is to prevent initial wheel slip from causing an automatic brake application in a vehicle having an overspeed detection system. It can now be appreciated that this is accomplished through bypassing the overspeed detection system for a predetermined time following the initial application of power. Other wheel slips are not affected by this invention since the invention itself is normally inactive a short time after the vehicle is underway.

While there has been described what is at present considered to be the preferred embodiment of the invention, it will be obvious to those skilled in the art that various changes and modifications may be made therein, without departing from the invention, and it is therefore aimed in the appended claims to cover all such changes and modifications as fall within the true spirit and scope of the invention.

What is claimed is:

1. In a self-powered vehicle having equipment for automatically applying brakes when overspeeds occur, the combination of
   a throttle control device for applying vehicle power,
   a timer connected to the throttle control device and adapted to measure a predetermined time interval beginning when power is applied, and
   bypassing means controlled by the timer for rendering the automatic brake application equipment ineffective during the predetermined interval.

2. The invention according to claim 1 wherein the throttle control device contains a contact normally closed only when no vehicle power is being applied and wherein the timer is adapted to measure said predetermined time interval beginning when said contact is opened.

3. The invention according to claim 2 wherein the timer is electrically maintained in a set condition through the said normally closed throttle control device contact.

4. The invention according to claim 3 in combination with means for detecting vehicle motion, connected to the timer, for preventing the timer from measuring the predetermined time interval beginning when power is applied if vehicle motion is being detected at that time.

5. The invention according to claim 4 wherein the vehicle motion detecting means includes a relay normally released only when no vehicle motion is detected and wherein the timer is electrically maintained in a set condition through a back contact of said relay connected in series with said normally closed throttle control device contact.

6. The invention according to claim 1 wherein the bypassing means comprises a relay normally energized when the timer is operating.

7. The invention according to claim 6 wherein the automatic brake application equipment controls a normally energized electropneumatic valve and wherein said relay, when energized, supplies electrical energization directly to said electropneumatic valve, whereby said valve cannot be deenergized by operation of the automatic brake application equipment.

8. In a self-powered vehicle having equipment for automatically applying brakes when overspeeds occur, the combination of
   means for detecting vehicle motion,
   a timer connected to the vehicle motion detecting means for measuring a predetermined time interval beginning when motion is detected, and
   bypassing means controlled by the timer for rendering the automatic brake application equipment ineffective during the predetermined time interval.

9. The invention according to claim 8 wherein the vehicle motion detecting means includes a relay normally released only when no vehicle motion is detected and wherein the timer is electrically maintained in a set condition through a back contact of said relay.

References Cited

UNITED STATES PATENTS 2,279,398  4/1942  Hewitt.
3,253,143  5/1966  Hughson.
3,285,196  11/1966  Livingston.
3,287,555  11/1966  Livingston et al.

ARTHUR L. LA POINT, Primary Examiner

G. LIBMAN, Assistant Examiner

U.S. Cl. X.R.

246—187